Figure 1:
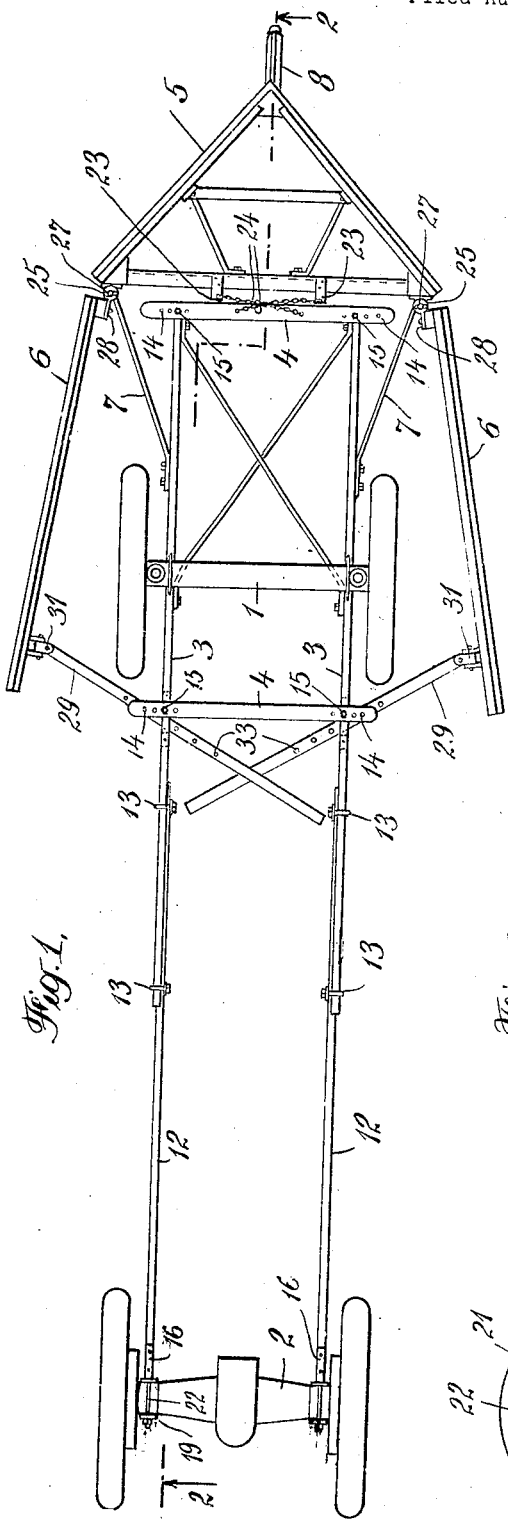

July 22, 1924.

D. A. SARGENT

TRUCK SNOWPLOW

Filed Aug. 21, 1923

1,502,591

INVENTOR
Don A. Sargent
BY Pennie, Davis, Marvin, Edmonds
his ATTORNEYS

Patented July 22, 1924.

1,502,591

UNITED STATES PATENT OFFICE.

DON A. SARGENT, OF BANGOR, MAINE, ASSIGNOR TO NORTHERN TRAILER COMPANY, OF BANGOR, MAINE, A CORPORATION OF MAINE.

TRUCK SNOWPLOW.

Application filed August 21, 1923. Serial No. 658,484.

*To all whom it may concern:*

Be it known that I, DON A. SARGENT, a citizen of the United States, residing at Bangor, in the county of Penobscot, State of Maine, have invented certain new and useful Improvements in Truck Snowplows; and I do hereby declare the following to be a full, clear, and exact description of the invention, such as will enable others skilled in the art to which it appertains to make and use the same.

This invention relates to snow plows, and in particular to plows designed to be secured to motor trucks.

Where streets or roadways are filled with very deep or drifted snows, a powerful tractor drawn plow, such as described and claimed in my copending application, Serial No. 658,485, filed concurrently herewith, should be used to open up the thoroughfare for traffic. But with lighter, undrifted falls, that is with falls of about two feet or less in depth, it is quite possible to remove the snow by means of lighter plows secured to motor vehicles, lighter than caterpillar tractors.

It is an object of the present invention to improve the design of such plows so that motor vehicles, particularly trucks, may be used, not only for the general work of clearing snow-bound thoroughfares, but may be equipped with their own snow removing apparatus. I have accordingly provided a plow having a frame designed to be secured to both axles of a truck, so that the snow resistance is distributed; this frame being designed for both longitudinal and transverse adjustment to fit any chassis. I have designed the frame to hang below the axles and be secured to the rear axle in such a manner that there is no direct thrust on this axle. The frame can move slightly relative to the axle and thus absorb sudden shocks which might otherwise injure the housing. On the other hand, the clamp, which I have designed, tightens as the frame moves, and therefore prevents excessive displacement. This clamp is also designed to fit rear axles having housings of various sizes. At the forward end of this frame, I have mounted a V-shaped nose designed for slight free movement in a vertical plane, and capable of being swung up out of the way or entirely removed from the frame when not needed. I have also provided adjustable wings, which form in effect extensions of the sides of the nose, and which may also be readily removed from the frame when not needed. Besides these things, I have made improvements in various details, which will be pointed out in the following description, in which, for the sake of clearness, I have made reference to the accompanying drawings, which illustrate a preferred embodiment of my invention.

Figure 2:
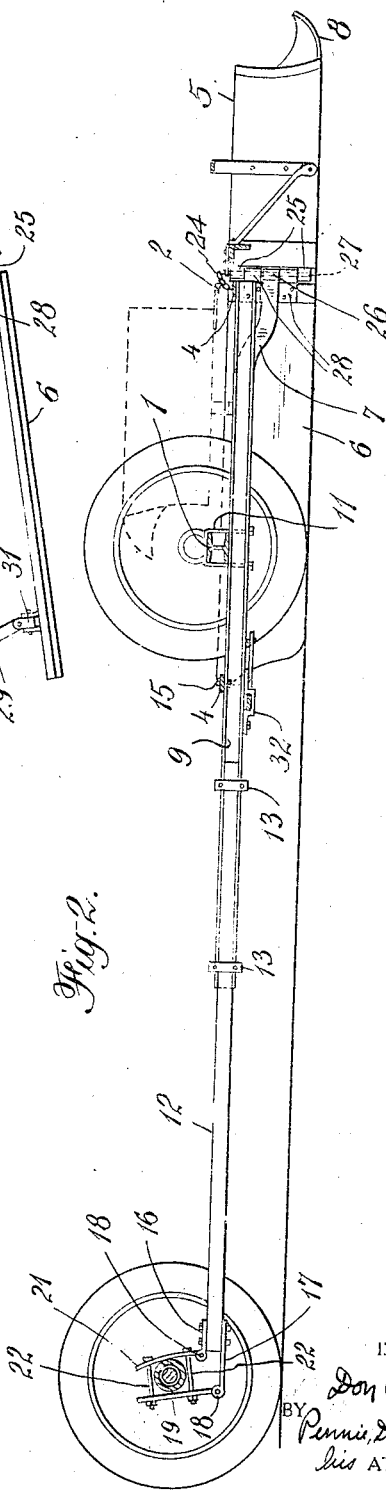

In these drawings, Fig. 1 is a plan view of my improved plow, shown mounted upon a truck, nothing of the truck being illustrated except the front and rear wheels and axles; and Fig. 2 is a longitudinal, vertical section taken along line 2—2 of Fig. 1.

The front and rear axles of the truck illustrated in these figures, and to which the plow frame is secured, are designated by reference numerals 1 and 2 respectively. The front axle is of the ordinary I-beam construction, while the rear axle is shown comprising the ordinary housing and differential casing. As used in this specification, the term—rear axle—will refer to the entire member, and not to the actual power-transmitting shaft, not shown.

The plow illustrated is provided with a frame comprising longitudinal members 3 and transverse members 4, the longitudinal members being clamped to the axles 1 and 2, as shown. Near the forward end of this frame, and forming a part thereof, are fixed two outwardly and forwardly extending arms 7 upon which a V-shaped nose 5 is mounted for slight up and down and swinging movement in a vertical plane. Wings 6 pivoted upon the arms 7, form in effect the extensions of the sides of the nose, and can be adjusted laterally to suit the conditions. The apex of the nose is provided with a curved shoe 8, which assists in guiding it over irregularities in the roadway. Both the sides of the nose and the wings are concave so that they roll the snow rather than push it.

I shall now describe the construction of the frame and the manner in which it is secured to the axles. The forward ends of the side members 3 are formed of channel irons 9 and are hung beneath and secured to the front axle of the truck by means of U-bolt clamps 11. The rear ends of these longitudinal side members are formed of wooden bars 12, which fit between the flanges of the channels 9 and are held in place by means of U-bolt clamps 13. The length of the frame may thus be varied within wide limits by loosening the clamps 13, by extending or telescoping the members 9 and 12 relative to each other. The transverse members 4 are provided with a series of holes 14 through which bolts 15 are adapted to pass and secure the members 4 to the upper flanges of the channels 9. It is thus obvious that the width of the frame may be varied to suit trucks of various widths.

The rear end of the frame is secured to the rear axle by a specially designed clamp, which I shall now describe. Plates 16 and 17 bolted to the upper and lower faces respectively of the members 12 extend rearwardly therefrom, and terminate in hinge knuckles 18. Upon these knuckles are hinged 2 upstanding plates 19 and 21; plate 21 being curved, as shown, in order to grip more securely the usual curved faces of the rear axle housing. These plates 19 and 21 are held fast to the axle by means of bolts 22, which pass through them and on either side of the axle. When these bolts are tightened and the U-bolt clamps 13 made to hold the members 9 and 12 in relatively fixed relation, it is clear that the snow resistance is distributed between the two axles. It is important, however, that the rear axle, with its enclosed transmission, should be protected from sudden shocks, which might otherwise injure it. Assuming, therefore, that the U-bolt clamp 11 works loose or is not sufficient to absorb a sudden shock, the plates 19 and 21 swing slightly about the hinge knuckles 18, and thus relieve the axle of the shock. At the same time, however, this movement by tending to distort the figure formed by the plates 19 and 21 and the bolts 22 will tighten the grip of these members upon the rear axle.

I shall now describe the manner in which the nose is connected to the frame. The nose is secured to the frame through the arms 7 which take the thrust of the snow. The nose is provided at either side with a pair of eyes 25, which are normally in alignment with an eye 26 on each arm 7. A pin 27 passes through these eyes and holds the parts in position. There is, however, sufficient looseness at this point to permit a substantial up and down movement of the nose relative to the frame. Should the use of the nose, no longer be required, it can be swung back out of operative position and carried upon the frame, as indicated in dotted lines in Fig. 2, by merely withdrawing the pins 27 and swinging the nose back upon the forward end of the frame, as shown in dotted lines in Fig. 2, a pair of crossed chains 24, connecting the rear of the nose with the frame acting as hinge members.

I shall now describe the wings, which may be employed in cooperation with the nose. These wings 6 are provided near their forward ends with eyes 28, which are brought in alignment with the eyes 25 and 26, and held in position by means of the pins 27. Lateral adjustment of these wings to increase or decrease the width of the path to be plowed is effected through the bars 29, pivoted at 31, near the outer end of each wing. These bars are supported by means of guides or brackets 32 bolted to the lower flange of the channels 9. Bars 29 are provided with spaced holes 33 through which pins can be passed to bear against the channels 9 and hold the wings in adjusted position. When the nose is swung into inoperative position by removing the pins 27, it is, of course, customary to remove the wings at the same time.

The plow embodying the subject matter of this invention is simple and relatively inexpensive to construct; is readily attached to trucks of various sizes, distributes the snow pressure between the two axles without subjecting the rear axle to the danger of breakage through sudden shocks, can plow a path of varying width depending upon the setting of the wings, and can be readily and quickly dismantled as a plowing machine with a minimum of effort.

I claim:

1. A snow plow comprising the combination of a frame, a nose connected thereto, and means for securing the frame to both axles of a motor truck, said frame being adjustable longitudinally and laterally.

2. A snow plow comprising the combination of a frame, a nose connected thereto, and means for securing the frame to both axles of a motor truck, the longitudinal members of the frame comprising telescoping parts so that the length of the frame may be adjusted to fit trucks of various wheel bases.

3. Means for securing the frame of a snow plow to an axle of a motor truck, comprising a member hinged to the frame, and means for clamping said hinged member to the axle.

4. Means for clamping the rear end of a snow plow frame to the rear axle of a motor truck, comprising two upstanding plates hinged to the frame and designed to receive the axle between them, and bolts passing through the plates above and below the axle.

5. Means for clamping the rear end of a snow plow frame to the rear axle of a motor truck, comprising two upstanding plates hinged to the frame and designed to receive the axle between them, and bolts passing through the plates above and below the axle, one of said plates being curved.

6. A snow plow comprising the combination of a frame, a nose connected thereto, and means for securing the frame to the axles of a motor truck, the means for securing the frame to the rear axle comprising an upstanding member pivotally mounted on the frame.

7. A snow plow comprising the combination of a frame, a nose connected thereto, means for securing the frame to the axles of a motor truck, the means for securing the frame to the rear axle comprising two upwardly extending plates hinged to the frame, and means for bolting said plates to the axle.

8. A snow plow comprising the combination of a frame, a nose connected thereto, means for securing the frame to the axles of a motor truck, the means for securing the frame to the rear axle comprising two upwardly extending plates hinged to the frame, and means for bolting said paltes to the axle, one of said plates being curved.

9. In a snow plow comprising a frame and a nose connected thereto, the combination of means for clamping the frame to an axle of a motor truck and out of the horizontal plane of said axle, said means permitting slight horizontal movement of the frame relative to the axle to absorb shocks, such horizontal movement tightening the grip of the frame upon the axle.

10. A snow plow comprising the combination of a frame designed to be secured to a motor truck, arms extending outwardly from the frame near its forward end, a V-shaped nose connected to the arms for movement in a vertical plane, laterally adjustable wings pivoted adjacent the frame, eyes on the ends of the arms, eyes on the rear corners of the nose, eyes on the forward ends of the wings, and a pin passing through said eyes, and aligning them.

11. A snow plow comprising the combination of a frame designed to be secured to a motor truck, a nose, means for detachably connecting the nose to the frame to take the thrust of the snow, and a hinge connection between the nose and the frame enabling the nose to be swung back upon the forward end of the frame when not in use.

In testimony whereof I affix my signature.

DON A. SARGENT.